United States Patent [19]
Ivie

[11] Patent Number: 5,219,818
[45] Date of Patent: * Jun. 15, 1993

[54] METHOD OF PROCESSING PEANUT HULLS AND PEANUT HULL GRANULE PRODUCT

[75] Inventor: Stephen L. Ivie, Ashburn, Ga.

[73] Assignee: Bio-Plus, Inc., Ashburn, Ga.

[*] Notice: The portion of the term of this patent subsequent to Aug. 20, 2008 has been disclaimed.

[21] Appl. No.: 901,876

[22] Filed: Jun. 22, 1992

Related U.S. Application Data

[63] Continuation-in-part of Ser. No. 729,608, Jul. 15, 1991, abandoned, which is a continuation-in-part of Ser. No. 488,170, Mar. 5, 1990, Pat. No. 5,041,410.

[51] Int. Cl.$^5$ ............................................. B01J 20/28
[52] U.S. Cl. ..................................... 502/401; 43/124; 71/23; 71/904
[58] Field of Search .................... 43/124, 131; 71/23, 71/904; 502/401

[56] References Cited

U.S. PATENT DOCUMENTS

| | | | |
|---|---|---|---|
| 2,168,532 | 8/1939 | McMath et al. | 99/3 |
| 3,059,615 | 10/1962 | Kuceski et al. | 119/1 |
| 3,286,691 | 11/1966 | McFadden | 119/1 |
| 3,921,581 | 11/1975 | Brewer | 119/1 |
| 3,941,090 | 3/1976 | Fry | 119/1 |
| 3,983,842 | 10/1976 | Marion et al. | 119/1 |
| 4,145,206 | 3/1979 | Ford | 71/23 |
| 4,529,407 | 7/1985 | Johnston et al. | 44/21 |
| 4,561,860 | 12/1985 | Gulley et al. | 44/10 |
| 4,579,579 | 4/1986 | Kerr | 71/23 |
| 4,607,594 | 8/1986 | Thacker | 119/1 |
| 4,621,011 | 11/1986 | Fleischer et al. | 428/221 |
| 4,821,677 | 4/1989 | Harrison | 119/1 |

OTHER PUBLICATIONS

Peanut Hulls: Their Properties and Potential Uses, by W. J. Albrecht, Agricultural Reviews and Manuals, U.S. Department of Agriculture, Southern Series, No. 1, Jan. 1979.

Richard Halliburton; Statement of Richard Halliburton; Dec. 11, 1991; entire text, Document Nos. 1-2.
Green Light Company; Purchase Order No. 0195; Nov. 15, 1988; entire text, Document No. 3.
Joan S. Simpson; Statement of Joan S. Simpson; Jun. 12, 1992; entire text, Document Nos. 4-5.
Consolidated Pelletizing Corp.; (Untitled); Invoice No. 8111; Dec. 2, 1988; entire text, Document No. 6.
Consolidated Pelletizing Corp.; (Untitled); Shipping Order No. 7222; Dec. 1, 1988; entire text, Document No. 7.
Consolidated Pelletizing Corp.; Bill of Lading; Dec. 1, 1988; entire text, Document No. 8.
Consolidated Pelletizing Corp.; Loading Order No. 4394; Dec. 1, 1988; entire text, Document No. 9.
Consolidated Pelletizing Corp.; Order No. 1574; Nov. 30, 1988; entire text, Document No. 10.
Consolidated Pelletizing Corp.; (Untitled) Shipping Order No. 7221; Dec. 1, 1988; entire text, Document No. 11.
Consolidated Pelletizing Corp.; Bill of Lading; Dec. 1, 1988; entire text, Document No. 12.
Consolidated Pelletizing Corp.; Loading Order No. 4393; Dec. 1, 1988; entire text, Document No. 13.
Consolidated Pelleting Corp.; Order No. 1575; Nov. 30, 1988; entire text, Document No. 14.
Phil J. Phillips; Statement of Phil J. Phillips; Dec. 27, 1991; entire text, Document Nos. 15 and 16.
P & M Products Inc.; Delivery Receipt-Order No. 19731; Jan. 24, 1989; entire text, Document No. 17.
Green Light Home Garden Products; Check No. 061696; Jan. 31, 1988; entire text, Document No. 18.

(List continued on next page.)

*Primary Examiner*—W. J. Shine
*Attorney, Agent, or Firm*—Hopkins & Thomas

[57] ABSTRACT

Peanut hulls are processed into dust free granules suitable for use as chemical carriers and moisture absorbent materials by being pulverized to a powder. This is done by milling the hulls through a screen having interstices no larger than 3/32 inch. The powder is then compacted into compact masses that are divided into granules and screened.

21 Claims, No Drawings

OTHER PUBLICATIONS

P & M Products Inc.; Invoice No. 0019731; Jan. 25, 1989; entire text; Document No. 19.

Richard Hallibutton; Statement of Richard Hallibutton; Dec. 11, 1991; entire text; Document No. 20.

Stephen L. Ivie; Sycamore Pellet Systems, Inc. Letter; May 2, 1988; entire text; Document Nos. 21 and 22.

Stephen L. Ivie; Stephen L. Ivie Letter; Jul. 15, 1988; entire text; Document Nos. 23 and 24.

Stephen L. Ivie; Sycamore Pellet Systems, Inc. Letter; Aug. 29, 1988; entire text; Document No. 25.

Stephen L. Ivie; Sycamore Pellet Systems, Inc. Letter; Sep. 8, 1988; Document No. 26.

Stephen L. Ivie; Sycamore Pellet Systems, Inc. Letter; Sep. 23, 1988; entire text, Document No. 27.

Stephen L. Ivie; Sycamore Pellet Systems, Inc. Letter; Oct. 17, 1988; entire text, Document No. 28.

Stephen L. Ivie; Sycamore Pellet Systems, Inc. Letter; Nov., 1988; entire text, Document No. 29.

Oil-Dri Corporation of America; Material Safety Data Sheet—Pel-Unite; May 16, 1990; entire text, Document Nos. 30 and 31.

Oil-Dri Corporation of America; Advertising Bulletin No. 310—Pel-Unite; (Undated); entire text, Document No. 32.

Author unknown; Advertisement—Pel-Unite; (date unknown); entire text, Document No. 33.

Oil-Dri Corporation of America; Advertisement—Pel-Unite; (Date Unknown); entire text, Document No. 34.

Oil-Dri Corporation of America; Advertisement—Pel-Unite; (Date Unknown); entire text, Document No. 35.

METHOD OF PROCESSING PEANUT HULLS AND PEANUT HULL GRANULE PRODUCT

REFERENCE TO RELATED APPLICATION

This is a continuation-in-part of application Ser. No. 07/729,608, filed Jul. 15, 1991, now abandoned, which is a continuation-in-part of application Ser. No. 07/488,170, filed Mar. 5, 1990, issued on Aug. 20, 1991 as U.S. Pat. No. 5,041,410.

TECHNICAL FIELD

This invention relates to methods of processing peanut hulls into forms suitable for use as chemical carriers and as moisture absorbent materials.

BACKGROUND OF THE INVENTION

Commercial peanut shelling operations today create large quantities of peanut hulls. Since the sale of the hulls has not usually proven to be profitable, a percentage of shells have normally been disposed of, as by incineration, which produces air borne pollutants that degrade the atmosphere, or by dumping with its problems of continuous accumulations.

There are some situations where peanut hulls are sold on a limited basis as an economical by-product of the shelling operation rather than discarded or processed as waste. Heretofore, these have primarily been limited to the use of peanut hulls for litter, as filler in artificial fireplace logs, and as cattle feed roughage. These limited usages however place demand far below shell availability.

It has also been known that peanut hulls have the potential for profitable commercial use in other applications. This is attributable to their chemical inertness property which renders them suitable as carriers for pesticides and fertilizers. Their high liquid absorbing property also renders them potentially suitable for use in a number of industrial processes as moisture absorbent agents.

Attempts at transforming peanut hulls into masses of size and weight suitable for use as chemical, i.e. pesticide and fertilizer carriers and absorbent agents have been beset with problems. Foremost among these has been the creation of dust as the hulls are reconfigured as by milling and pelletizing. The resulting granules have also been too light in weight for these targeted usages, and have had variable moisture levels.

SUMMARY OF THE INVENTION

A method has now been discovered for processing peanut hulls into substantially dust free granules that are suitable for use as pesticide and fertilizer carriers and as moisture absorbent materials. The method comprises the steps of pulverizing the peanut hulls to a powder as by milling them through a screen having interstices no greater than 3/32 inch which size limitation has been discovered to be of critical importance. Preferably they are milled through a 1/16 inch screen. After the peanut hulls have been pulverized the powder is compacted into highly compact, dense masses of a size greater than the size of the end product. If desired the compaction sheets or pellets are dried to limit their moisture level. The compacted masses are divided into granules as by being crumbled, flaked or chipped. Finally, the crumbles are screened into selected granule sizes.

DETAILED DESCRIPTION

Essentially the new process transforms the weight, density, shape, size, moisture level and structural integrity of peanut hulls into granules that are suitable for use as carriers of chemical agents and as moisture absorbent materials for use in various industrial processes. After an initial grinding, that is conventionally done at the commercial sheller, the peanut hulls are further ground or milled through a screen preferably having 1/16 inch interstices. A 300 to 350 HP, full cycle hammermill (or two 150 HP hammermills), are preferably used. This causes the hulls to be ground into powder, the term "powder" herein referring to hull material passed through a screen having screen openings no greater than 3/32 inch. It is critically important that the screen interstices be no more than 3/32 inch. Screen openings any larger than that, such as even as small as ⅛ inch, have been found to be ruinous of the process in that the final product is entirely too dusty, flaky and light in weight for extensive commercial use.

The peanut hull powder is next compacted by being pelletized or compacted into compaction sheets. Where the hulls are compacted a compactor produced by Prater Industries of Chicago, Ill. has been found to work satisfactorily in producing 48 inch long compaction sheets 4 to 8 inches wide. Where the hulls are pelletized a large 300 HP pellet mill has been found to work well that produces pellets of a 5/16 inch diameter and approximately ¾ inch long size. The compaction is to such a high degree that the pellets have a pour weight of between 36 and 42 pounds per cubic foot with 38-40 pounds per cubic foot being preferred. If required for a specific end use, the compaction sheets or pellets are dried to limit this moisture level such as to approximately 7% by weight.

Following the compaction step the compacted masses, in the form of pellets or compaction sheets, are divided and broken up into granules. A slowly driven large crumble roll or Prater flaker has been found to create granules of good consistency. Conversely, hammermilling has been found to be too violent. The compaction of the powder is such that the weight of the end product granules is between some 26 and 30 pounds per cubic foot, with 27 to 29 pounds being preferred and 28 pounds per cubic foot being ideal. With less compaction the end product is too light. Compaction sheets may be broken up by rotating steel finger tips with the Prater compactor.

Finally, the granules are separated as by the use of shaker screens which divides and separates the granules into selected sizes This is done sufficiently slow to reduce the residual dust content to approximately 2% or less and preferably less than 1%. For use as carriers of pesticides, i.e. insecticides, herbicides, fungicides and rodenticides the granules should be generally round, granular shaped and not flat. Ninety-nine percent of the end product should pass through a 14 gauge screen and not pass through a 40 gauge screen.

Again it is emphasized that it is critical for the peanut hulls to be ground or milled to powder size for this enables the material to be compacted into sufficiently dense masses. Compaction should be such as to produce a pour weight of at least 36 pounds per cubic foot for 5/16 diameter by ¾ inch long cylindrical pellets. Without this degree of density the dust content and product weight has been found to be unsuitable for the above mentioned commercial applications.

Though the preferred form of the invention has been described in detail, it should be understood that numerous modifications may be made thereto without departure from the spirit and scope of the invention as set forth in the following claims.

I claim;

1. A product for use as a chemical carrier, consisting essentially of peanut hull granules, said granules being formed by grinding peanut hulls to a powder, then compacting the powder into a compacted mass and thereafter crumbling the compacted mass.

2. The product of claim 1, having a weight of from approximately 26 to 30 pounds per cubic foot.

3. The product of claim 1, having a moisture content of approximately 7 percent or less by weight.

4. The product of claim 1, having a maximum residual dust content of approximately 2%.

5. The product of claim 4, having a weight of 26 to 30 pounds per cubic foot and a moisture level of approximately 7% or less by weight.

6. A product for use as a chemical carrier, consisting essentially of peanut hull granules, said granules being formed by milling peanut hulls through a screen defining openings of approximately 1/16 inch to produce a peanut hulls powder, then compacting the peanut hulls powder into compacted masses and then crumble rolling the compacted masses into granules.

7. The product of claim 6, said compacted masses having a pour weight of between approximately 36 and 42 pounds per cubic foot.

8. The product of claim 6, said peanut hulls also being formed by shaking the granules on shaker screens after the step of crumble rolling the compacted masses into granules.

9. The product of claim 6, having a maximum residual dust content of approximately 2%.

10. The product of claim 6, having a moisture level of approximately 7% or less by weight.

11. The product of claim 9, having a moisture level of approximately 7% or less by weight.

12. A method of producing peanut hull granules for use as a chemical carrier or to absorb moisture, comprising the steps of:
    (a) pulverizing the peanut hulls to a powder,
    (b) compacting the peanut hulls powder into compacted masses, and
    (c) crumbling the compacted masses into granules.

13. The method of claim 12 wherein in step (c) the compacted masses are crumble rolled.

14. The method of claim 12, further comprising the step of (d) screening the granules.

15. The method of claim 14, wherein the screening of the granules reduces the residual dust content to approximately 2% or less.

16. The method of claim 12, further comprising the step of (e) controlling the moisture level of the granules so that the granules have a moisture level of approximately 7% or less by weight.

17. A method of producing peanut hull granules for use as a chemical carrier or to absorb moisture, comprising the steps of:
    (a) milling the peanut hulls through a screen defining openings of approximately 1/16 inch to produce a peanut hulls powder,
    (b) compacting the peanut hulls powder into compacted masses, and
    (c) crumble rolling the compacted masses into granules.

18. The method of claim 17, further comprising the step of (d) screening the granules.

19. The method of claim 18, wherein the screening of the granules reduces the residual dust content to approximately 2% or less.

20. The method of claim 16, further comprising the step of (e) controlling the moisture level of the granules so that the granules have a moisture level of approximately 7% or less by weight.

21. The method of claim 17, said compacted masses having a pour weight of between approximately 36 and 42 pounds per cubic foot.

* * * * *

UNITED STATES PATENT AND TRADEMARK OFFICE
CERTIFICATE OF CORRECTION

PATENT NO. : 5,219,818

DATED : June 15, 1993

INVENTOR(S) : Stephen L. Ivie

It is certified that error appears in the above-identified patent and that said Letters Patent is hereby corrected as shown below:

```
    Column 2, line 35, change "this" to --their--.
    Column 4, line 15, in claim 16, after "claim", change
"12" to --14--.
    Column 4, line 34, in claim 20, after "claim", change
"16" to --18--.
```

Signed and Sealed this

Eighteenth Day of October, 1994

Attest:

BRUCE LEHMAN

Attesting Officer

Commissioner of Patents and Trademarks